United States Patent [19]

Ramsay

[11] 4,158,466

[45] Jun. 19, 1979

[54] INSECT DEFLECTOR FOR AUTOMOTIVE VEHICLES

[76] Inventor: H. Allen Ramsay, Box 311, Orangewood Apt. 444, Orange Grove Rd., Tucson, Ariz. 85704

[21] Appl. No.: 685,509

[22] Filed: May 12, 1976

[51] Int. Cl.² ............................................. B62D 35/00
[52] U.S. Cl. ........................................ 296/91; 296/1 S
[58] Field of Search ................. 296/1 S, 91, 95 R, 96

[56] References Cited

U.S. PATENT DOCUMENTS

| | | | |
|---|---|---|---|
| 3,239,267 | 3/1966 | Reynolds | 296/96 X |
| 3,862,777 | 1/1975 | Schifano | 296/91 |
| 3,904,236 | 9/1975 | Johnson | 296/91 |
| 3,977,716 | 8/1976 | Whited | 296/91 |

Primary Examiner—Philip Goodman

[57] ABSTRACT

An insect deflector consisting of a transparent centrally hinged deflector attached to plastic attaching strips at each end of the deflector and mounted to an edge of the vehicle by a bracket attached to the distal ends of each of the mounting strips, adjustable straps tighten the deflector on the adjustable mounting strips and attachments to the front of the bottom edge of the window of the vehicle engage attachments to the deflector to position the deflector at the proper distance from the window to deflect insects from the window surface.

1 Claim, 6 Drawing Figures

INSECT DEFLECTOR FOR AUTOMOTIVE VEHICLES

I have invented a new and novel insect reflector for automotive vehicles, such as buses and trucks. My insect deflector when properly adjusted, will prevent insects from blocking the view from vehicles such as buses and trucks of the flat nosed variety.

My invention can be understood in view of the accompanying figures.

Figure 1:
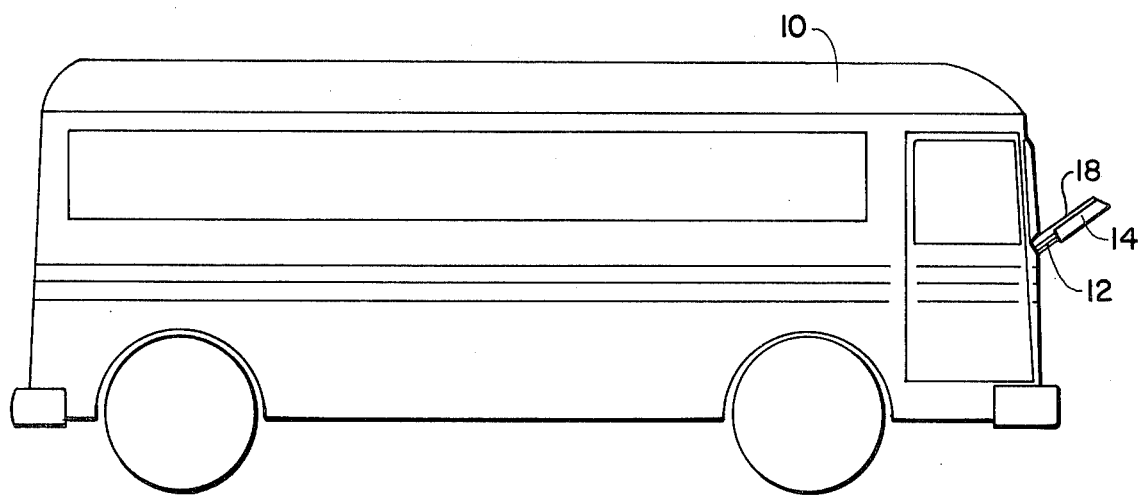
FIG. 1 is a side view of a bus with the insect deflector attached.
Figure 4:
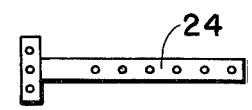
FIG. 4 is a view of an attachment for holding the deflector at the proper distance from the front of the bus.
Figure 2:
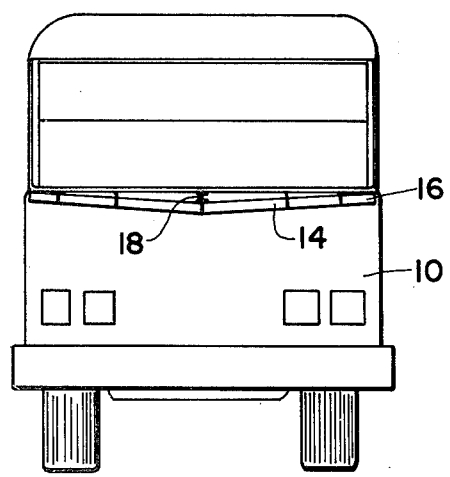
FIG. 2 is a front view of the bus of FIG. 1 with the insect deflector attached.
Figure 5:
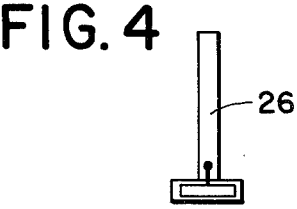
FIG. 5 is a view of an attachment for attaching the spacer of FIG. 4 to the deflector.
Figure 3:
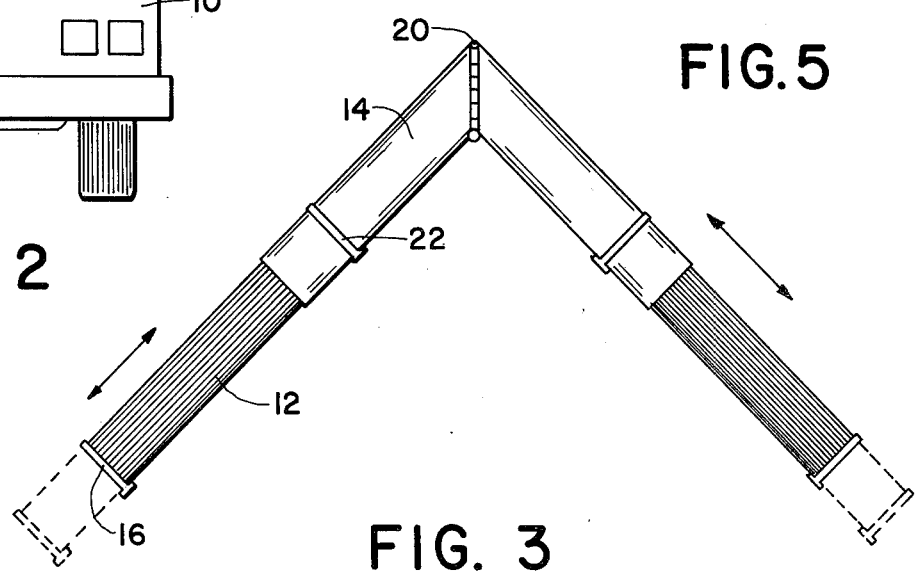
FIG. 3 is a top view of the assembled insect deflector.
Figure 6:
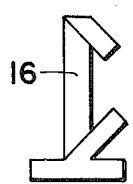
FIG. 6 is a view of a bracket for attaching the deflector to the side of the vehicle.

With regard to FIGS. 1, 2, 3, 4, 5, and 6, a bus 10 has adjustable mounting strips 12, made of a plastic material, supporting a central deflector piece 14, made of a transparent material. The adjustable plastic strip 12 is attached to the side of the vehicle by mounting brackets 16 and the front of the deflector 14 is positioned, parallel to, and below the window of the bus 10 by spacing members 18. A hinge 20 permits adjustment of the angle between the components of the transparent deflector 14 which helps fit the deflector to various vehicles. The hinge 20 has reinforcement so that the strength of the deflector 14 is not effected by the position of the hinge 20. Straps 22 attached around the deflector member 14 tighten the deflector member against the adjustable plastic strip 12 in order to secure the deflector in the proper size configuration for the particular vehicle to which it is attached. By suitable adjustments of the hinge 20 and the strips 12, the width of the deflector is adjustable and the distance the deflector extends in front of the vehicle and the angle of the deflector is determined. The deflector sets up an air current to carry the insects over the cab of the vehicle.

The components of the deflector positioner 18 consists of a member 24 for attaching to the front of the vehicle and an adjusting member 26 for attaching to the deflector 14. The straps 12 can also be made of a metal material where additional strength is needed to support the deflector 14.

A preferred width for the deflector 14 is 10 inches to maximize the deflective effects of the deflector 14.

The adjustable straps 24 are attached to the care of the vehicle 10 and the brackets 16 are attached to the deflector. The adjustable stops 26 connect the brackets 16 to the straps 24 after the deflector is positioned.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. An insect deflector for use on automotive vehicles, comprising:
   a centrally hinged deflector,
   an adjustable mounting strip attached to each distal end of the deflector,
   a bracket attachable to a side of a vehicle adjacent to a lower edge of a window of the vehicle,
   the bracket forming a hook for attachment to a distal end of one of the adjustable mounting strips,
   the adjustable mounting strip secured to the deflector by an adjustable strap,
   the deflector made of a transparent material, the adjustable mounting strip made of a plastic material,
   a means of positioning the deflector in front of the window is a first attachment securable to a bottom edge of the window, and a second attachment securable to the deflector and engaging the first attachment, whereby the space between the window and the deflector may be maintained,
   a reinforcement is attached to the hinge, whereby the strength of the deflector may be maintained while adjusting the angle of the deflector, and the adjustable mounting strips are made of a metal material.

* * * * *